US012715460B2

(12) United States Patent
Ross

(10) Patent No.: US 12,715,460 B2
(45) Date of Patent: Aug. 25, 2026

(54) COMMUNICATION METHOD

(71) Applicant: Robert Bosch GmbH, Stuttgart (DE)

(72) Inventor: Hans-Leo Ross, Lorsch (DE)

(73) Assignee: ROBERT BOSCH GMBH, Stuttgart (DE)

( * ) Notice: Subject to any disclaimer, the term of this patent is extended or adjusted under 35 U.S.C. 154(b) by 190 days.

(21) Appl. No.: 17/937,279

(22) Filed: Sep. 30, 2022

(65) Prior Publication Data

US 2023/0166749 A1 Jun. 1, 2023

(30) Foreign Application Priority Data

Nov. 29, 2021 (DE) ..................... 10 2021 213 411.4

(51) Int. Cl.
*B60W 50/06* (2006.01)
*B60R 16/023* (2006.01)
*H04L 67/12* (2022.01)

(52) U.S. Cl.
CPC ......... *B60W 50/06* (2013.01); *B60R 16/0231* (2013.01); *H04L 67/12* (2013.01)

(58) Field of Classification Search
None
See application file for complete search history.

(56) References Cited

U.S. PATENT DOCUMENTS 6,405,128 B1 * 6/2002 Bechtolsheim .... G01C 21/3667 340/988
11,704,007 B2 * 7/2023 Adenwala ............. G07C 5/008 715/733
2017/0324667 A1 * 11/2017 Camacho ........ H04M 1/724098
2017/0351261 A1 12/2017 Levinson et al.
2018/0232959 A1 * 8/2018 Thornburg .......... H04L 43/0805
2019/0173951 A1 * 6/2019 Sumcad .................. H04L 67/55
2020/0019187 A1 * 1/2020 Wu .................. G08G 1/096725
2020/0160694 A1 * 5/2020 Jornod ................ G08G 1/0141
2020/0192400 A1 * 6/2020 Alawieh ................ G05D 1/247
2020/0393837 A1 12/2020 Zhang et al.
2021/0152639 A1 5/2021 Madden
2021/0213969 A1 * 7/2021 Hasberg .............. B60W 60/001
(Continued)

FOREIGN PATENT DOCUMENTS

DE 102019215815 A1 5/2020
DE 102020211557 A1 3/2022

OTHER PUBLICATIONS

Parzyjegla, "An Adaptive Broker Network for Publish/Subscribe Systems," Diploma Thesis, Technical University Berlin, 2005, pp. 1-117.

*Primary Examiner* — Justin S Lee
(74) *Attorney, Agent, or Firm* — NORTON ROSE FULBRIGHT US LLP

(57) ABSTRACT

A method for communicating between multiple components of an event chain for an at least semi-automated driving function of a motor vehicle, the multiple components being communication users of a publish-subscriber network. The method includes: publishing a first message with the aid of a first component of the multiple components, sending the first message to a second component of the multiple components and receiving the first message with the aid of the second component. An event chain for an at least semi-automated driving function of a motor vehicle, a computer program, and a machine-readable memory medium, are also described.

11 Claims, 2 Drawing Sheets

(56) References Cited

U.S. PATENT DOCUMENTS

2021/0303137 A1* 9/2021 Adenwala ............... H04W 4/44
2023/0076669 A1* 3/2023 Acharya ............... H04L 9/0816
2023/0120049 A1* 4/2023 Vangati ............... H04L 63/0428
709/203

* cited by examiner

COMMUNICATION METHOD

CROSS REFERENCE

The present application claims the benefit under 35 U.S.C. § 119 of German Patent Application No. 10 2021 213 411.4 filed on Nov. 29, 2021, which is expressly incorporated herein by reference in its entirety.

FIELD

The present invention relates to a method for communicating between multiple components of an event chain for an at least semi-automated driving function of a motor vehicle, to an event chain for an at least semi-automated driving function of a motor vehicle, to a computer program and to a machine-readable memory medium.

BACKGROUND INFORMATION

U.S. Patent Application Publication No. US 2020/0393837 A1 describes a method for the trajectory planning of autonomous vehicles.

U.S. Patent Application Publication No. US 2017/0351261 A1 describes an autonomous vehicle.

German Patent Application No. DE 10 2019 215 815 A1 describes a vehicle control system.

SUMMARY

An object underlying the present invention includes providing efficient communication between multiple components of an event chain for an at least semi-automated driving function of a motor vehicle.

This object may be achieved with the aid of the features of the present invention. Advantageous embodiments of the present invention are disclosed herein.

According to one first aspect of the present invention, a method is provided for communicating between multiple components of an event chain for an at least semi-automated driving function of a motor vehicle, the multiple components being communication users of a publish-subscriber network. According to an example embodiment of the present invention, the method includes the following steps:

- publishing a first message with the aid of a first component of the multiple components,
- sending the first message to a second component of the multiple components and
- receiving the first message with the aid of the second component.

According to one second aspect of the present invention, an event chain is provided for an at least semi-automated driving function of a motor vehicle. According to an example embodiment of the present invention, the event chain includes:

- multiple components, which are communication users of a publish-subscriber network,
- the event chain being configured to carry out the method according to the first aspect.

According to one third aspect of the present invention, a computer program is provided, which includes commands which, when the computer program is executed by an event chain according to the second aspect, prompt the event chain to carry out a method according to the first aspect of the present invention.

According to one fourth aspect of the present invention, a machine-readable memory medium is provided, on which the computer program according to the third aspect of the present invention is stored.

The present invention is based on and includes the finding that the above object may be achieved by the components of the event chain being users of a publish-subscriber network. This advantageously effectuates a decoupling of the information provider, i.e., the component that publishes a message, from the information recipients, i.e., the components that receive the published message. The components advantageously do not have to know one another. Components that publish messages and components that receive published messages advantageously do not have to exchange any pieces of information between one another about the sent and received messages. This advantageously reduces a volume of data to be transferred. Furthermore, a bandwidth available for the communication may be advantageously efficiently utilized. Thus, the components of the event chain are able to efficiently communicate among one another.

A component that publishes a message may also be referred to as a publisher.

A component that receives a message may also be referred to as a subscriber.

In one specific embodiment of the present invention, the event chain is implemented in an infrastructure. This yields, for example, the technical advantage that the event chain is able to be efficiently implemented.

In one specific embodiment of the present invention, it is provided that the event chain is implemented in the motor vehicle. This yields, for example, the technical advantage that the event chain is able to be efficiently implemented.

In one specific embodiment of the present invention, the event chain is implemented partially in an infrastructure and is implemented partially in the motor vehicle. This yields, for example, the technical advantage that the event chain is able to be efficiently implemented.

In one specific embodiment of the present invention, a component in the context of the description is an on-board component or is a component inherent to the infrastructure. This means, therefore, that a component may be part of the motor vehicle or part of the infrastructure.

Thus, this means, in particular, that a component may be encompassed by the motor vehicle or by the infrastructure.

In one specific embodiment of the present invention, it is provided that the first message is published on a particular topic, the first message being sent to the second component as a function of whether the second component has subscribed to the particular topic.

According to this specific embodiment of the present invention, the publish-subscriber network is a topic-based publish-subscriber network. This means, therefore that components may receive all messages that have been published on the topics to which they subscribe. The publisher is responsible for defining the topics to which subscribers may subscribe.

In one specific embodiment of the present invention, it is provided that the first message is sent to the second component as a function of whether an attribute and/or a content of the first message correspond(s) to a limitation defined with the aid of the second component.

This means, therefore, that according to this specific embodiment, the publish-subscriber network is a content-based publish-subscriber network, in which messages are conveyed only to the communication user or users if the attributes or the content of this message correspond to the limitations defined by the corresponding communication user or users. For example, it is established within the scope of the development which pieces of information are published by the publisher with which characteristics. As a result, the respective subscribers acquire with particular system-related mechanisms the certainty that the pieces of information are available to the subscriber in a timely manner with the agreed characteristics. The corresponding communication user or users is/are responsible for the classification of the messages.

In one specific embodiment of the present invention, the two preceding specific embodiments are combined with one another. This means, therefore that the publish-subscriber network is a topic-based as well as a content-based publish-subscriber network, i.e., a hybrid of a topic-based and content-based publish-subscriber network. Publishers publish messages on a topic, whereas subscribers register content-based subscriptions for one or for multiple topics.

According to one specific embodiment of the present invention, it is provided that the second component publishes a second message based on the first message, which is sent to a third component of the multiple components.

This yields, for example, the technical advantage that the event chain is able to operate efficiently if the reception of the first message with the aid of the second component results in the latter publishing a second message, which is sent to the third component. The event chain is thus passed through using the publish-subscriber network.

According to one specific embodiment of the present invention, it is provided that the multiple components are each an element selected from the following group of components: sensor, in particular, surroundings sensor, actuator sensor of the motor vehicle, inertial sensor of the motor vehicle, wheel rotation speed sensor of the motor vehicle, steering sensor of the motor vehicle, main control unit of the motor vehicle, actuator control unit of the motor vehicle, digital map, system for controlling a transverse guidance and/or longitudinal guidance of the motor vehicle, the system including, in particular, a steering system of the motor vehicle and/or a drive system of the motor vehicle and/or a braking system of the motor vehicle.

This yields, for example, the technical advantage that particularly suitable components are able to be used.

According to one specific embodiment of the present invention, it is provided that the first component is a surroundings sensor, which detects surroundings of the motor vehicle, so that the first message includes surroundings data, which represent the detected surroundings, the second component being a control unit of the motor vehicle, the third component being a system for controlling a transverse guidance and/or longitudinal guidance of the motor vehicle, the control unit ascertaining a control command for controlling a transverse guidance and/or longitudinal guidance of the motor vehicle based on the surroundings data, the second message including the control command, the system for controlling a transverse guidance and/or longitudinal guidance of the motor vehicle controlling the transverse guidance and/or longitudinal guidance based on the control command. The volume of data may be massively reduced by this application, if, for example, no new pieces of information are present at the publisher, the publisher sends, for example, the information only cyclically, so that the last valid piece of information continues to be current, and needs to send no further data. This is very efficient in the case of security systems, because only in the case of an error are then larger volumes of data which describe the error condition required to be transferred. Thus, as long as there is no change of information, it is sufficient, for example, to confirm also in closed control loops only the validity of the previous piece of information.

This yields, for example, the technical advantage that the transverse guidance and/or longitudinal guidance of the motor vehicle is/are able to be efficiently controlled.

Thus, according to this specific embodiment of the present invention, a regulation is implemented using the publish-subscriber network.

In one specific embodiment of the present invention, it is provided that a fourth component of the multiple components is, for example, a digital map, which represents surroundings of the motor vehicle, the fourth component publishing a third message, which includes at least a section of the digital map, the motor vehicle being located in the section, the third message being sent to the control unit of the motor vehicle, the control unit of the motor vehicle ascertaining the control command based on the section of the digital map. The digital map is used within the scope of a closed control loop as a publisher for the control loop.

This yields, for example, the technical advantage that the control command is able to be efficiently ascertained. In particular, an additional information source for the regulation is thus also available.

In one specific embodiment of the present invention, it is provided that the second component communicates in which time cycle it expects a message from the first component, the first message being sent to the second component based on the time cycle.

This yields, for example, the technical advantage that it may be efficiently ensured that the second component then also receives the first message if it expects or requires it. A camera, for example, may be used as the publisher for the quality of the lane guidance by the map. The camera (video camera) is used as feedback in the control loop. As long as the camera merely confirms that the motor vehicle is guided with sufficient quality in the lane by the map, it may, for example, be sufficient and, for example, be provided that the camera, for example, confirms only the adherence to the requirements of the lane guidance. Large volumes of data such as, for example, entire video streams, do not have to be continuously transferred in real time.

Thus, for example, at a speed of more than 50 km/h, a steering system expects new data, for example, every 10 ms, i.e., new messages so that the steering system is able to carry out a sudden lane change or is able to avoid an obstacle in the lane.

At the same speed, i.e., for example, at 50 km/h, an electric brake of a braking system requires, for example, the messages every 100 ms (time cycle).

At the speed of 50 km/h cited by way of example above, a drive system expects, for example, messages every 200 ms (time cycle).

The time cycles described above, when the individual systems expect messages, are a function, in particular, of the speed of the motor vehicle. At lower motor vehicle speeds, the time cycles may be longer compared to higher motor vehicle speeds.

The time cycle may, however, also be a function of weather, of a roadway condition and/or of a traffic density.

Thus, it is advantageously ensured that, for example, a system for controlling a transverse guidance and/or longitudinal guidance of the motor vehicle then receives control commands in a timely manner, i.e., according to the time cycle, so that the system is still able to safely guide the motor vehicle at instantaneous motor vehicle speeds, i.e., is still able to safely control the transverse guidance and/or longitudinal guidance of the motor vehicle based on the control commands.

In one specific embodiment of the present invention, it is provided that the publish-subscriber network includes a broker, to which the first message is sent, the broker sending the first message to the second component.

This may yield, for example, the technical advantage that the first message is able to be efficiently sent to the second component.

The broker may also be referred to as a message agent insofar as it forwards the published messages to the appropriate subscribers.

In one specific embodiment of the present invention, it is provided that the second component communicates the time cycle to the broker, the broker prompting the first component to send the first message to the broker based on the time cycle.

This may yield, for example, the technical advantage that it may be efficiently communicated to the first component according to which time cycle it is to publish the messages. Thus, it may further be advantageously ensured that, for example, a system for controlling a transverse guidance and/or longitudinal guidance of the motor vehicle receives control commands in a timely manner, i.e., according to the time cycle, for controlling the transverse guidance and/or longitudinal guidance of the motor vehicle, in order to safely guide the motor vehicle, i.e. to control the transverse guidance and/or longitudinal guidance of the motor vehicle.

According to one specific embodiment of the present invention, it is provided that the method according to the first aspect is a computer-implemented method.

An at least semi-automated driving function is able to drive the motor vehicle in at least a semi-automated manner.

The wording "at least semi-automated driving" includes one or multiple of the following cases: assisted driving, semi-automated driving, highly automated driving, fully automated driving. The wording "at least semi-automated" therefore includes one or multiple of the following wordings: assisted, semi-automated, highly automated, fully automated.

Assisted driving means that a driver of the motor vehicle continually carries out either the transverse guidance or the longitudinal guidance of the motor vehicle. The respectively other driving task (i.e., a controlling of the longitudinal guidance or of the transverse guidance of the motor vehicle) is carried out automatically. This means, therefore, that during an assisted driving of the motor vehicle either the transverse guidance or the longitudinal guidance is controlled automatically.

Semi-automated driving means that in a specific situation (for example: driving on an expressway, driving within a parking facility, passing an object, driving within a traffic lane which is defined by traffic lane markings) and/or for a certain period of time, a longitudinal guidance and a transverse guidance of the motor vehicle are controlled automatically. A driver of the motor vehicle him/herself does not have to manually control the longitudinal guidance and transverse guidance of the motor vehicle. However, the driver must continually monitor the automatic control of the longitudinal guidance and transverse guidance in order to be able to manually intervene if needed. The driver must be prepared to take full driving control of the motor vehicle at any time.

Highly automated driving means that for a certain period of time in a specific situation (for example: driving on an expressway, driving within a parking facility, passing an object, driving within a traffic lane which is defined by traffic lane markings), a longitudinal guidance and a transverse guidance of the motor vehicle are controlled automatically. A driver of the motor vehicle him/herself does not have to manually control the longitudinal guidance and transverse guidance of the motor vehicle. The driver does not have to continually monitor the automatic control of the longitudinal guidance and transverse guidance in order to be able to manually intervene if needed. If needed, a take-over request is automatically output to the driver for taking control of the longitudinal guidance and transverse guidance, in particular, with a sufficient time reserve. The driver must therefore potentially be able to take control of the longitudinal guidance and the transverse guidance. Limits of the automatic control of the transverse guidance and the longitudinal guidance are automatically recognized. During highly automated driving, it is not possible to automatically bring about a minimal risk state in every initial situation.

Fully automated driving means that in a specific situation (for example: driving on an expressway, driving within a parking facility, passing an object, driving within a traffic lane which is defined by traffic lane markings), a longitudinal guidance and transverse guidance of the motor vehicle are controlled automatically. A driver of the motor vehicle him/herself does not have to manually control the longitudinal guidance and transverse guidance of the motor vehicle. The driver does not have to monitor the automatic control of the longitudinal guidance and transverse guidance in order to be able to manually intervene if needed. Prior to a termination of the automatic control of the transverse guidance and longitudinal guidance, a request is automatically made to the driver to assume the driving task (control of the transverse guidance and longitudinal guidance of the motor vehicle), in particular, with a sufficient time reserve. If the driver does not assume the driving task, a return to a minimal risk situation takes place automatically. Limits of the automatic control of the transverse guidance and longitudinal guidance are automatically recognized. In all situations, it is possible to return to a minimal risk system state.

According to one specific embodiment of the present invention, it is provided that the method according to the first aspect is carried out with the aid of the event chain according to the second aspect of the present invention.

Features of the event chain according to the second aspect of the present invention may result, in particular, from corresponding method features and vice versa. Thus, this means, in particular, that technical functionalities of the event chain according to the second aspect similarly result from corresponding technical functionalities of the method according to the first aspect and vice versa.

An at least semi-automated driving function according to one specific embodiment of the present invention is an element selected from the following group of at least semi-automated driving functions: congestion assistance function, parking assistance function, lane-keeping assistance function, passing assistance function, longitudinal guidance function, transverse guidance function, longitudinal and transverse guidance functions.

This may yield, for example, the technical advantage that particularly suitable at least semi-automated driving functions are able to be selected.

The specific embodiments of the present invention described in the description may each be combined in arbitrary form among one another, even if this is not explicitly described.

According to one specific embodiment of the present invention, a surroundings sensor in the context of the description is one of the following surroundings sensors: radar sensor, LIDAR sensor, ultrasonic sensor, video sensor, magnetic field sensor, capacitive sensor, temperature sensor, moisture sensor, humidity sensor, audio sensor and infrared sensor.

BRIEF DESCRIPTION OF THE DRAWINGS

Exemplary embodiments of the present invention are represented in the figures and explained in greater detail in the following description.

DETAILED DESCRIPTION OF EXAMPLE EMBODIMENTS

Figure 1:
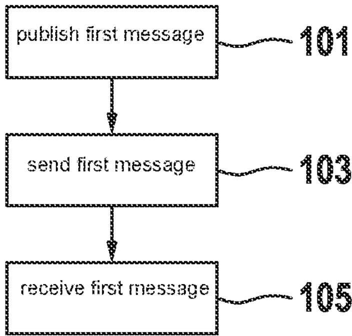
FIG. 1 shows a flowchart of a method for communicating between multiple components of an event chain for an at least semi-automated driving function of a motor vehicle, according to an example embodiment of the present invention.

FIG. 1 shows a flowchart of a method for communicating between multiple components of an event chain for an at least semi-automated driving function of a motor vehicle, the multiple components being communication users of a publish-subscriber network, including the following steps:

publishing 101 a first message with the aid of a first component of the multiple components, sending 103 the first message to a second component of the multiple components and receiving 105 the first message with the aid of the second component.

Figure 2:
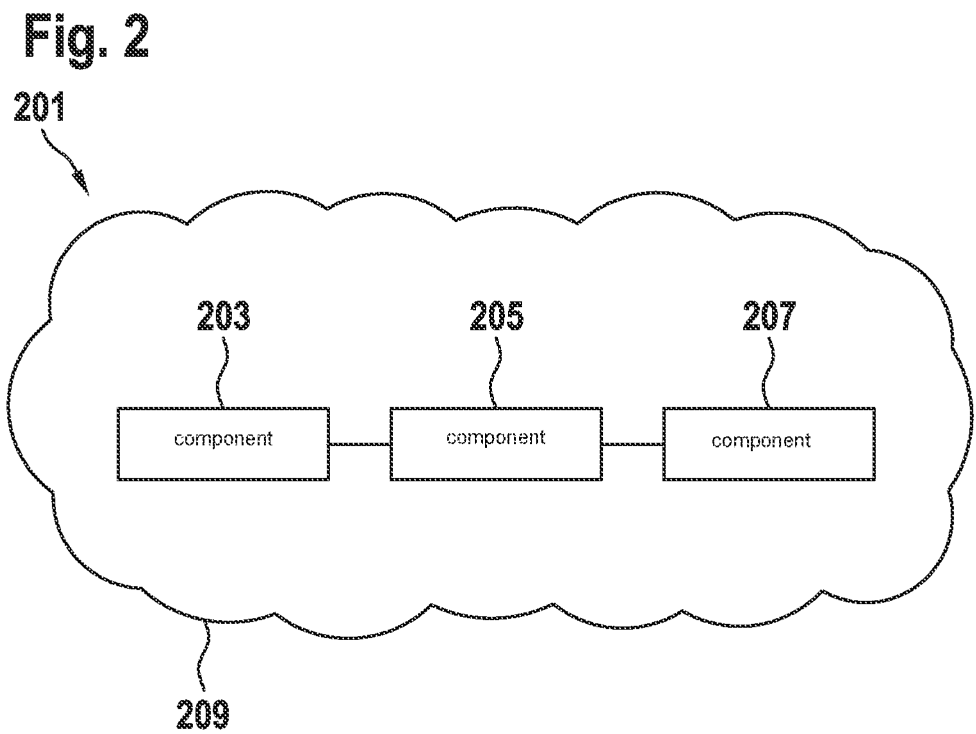
FIG. 2 shows a first event chain for an at least semi-automated driving function of a motor vehicle, according to an example embodiment of the present invention.

FIG. 2 shows a first event chain 201 for an at least semi-automated driving function of a motor vehicle, including: multiple components 203, 205, 207, which are communication users of a publish-subscriber network 209, the event chain 201 being configured to carry out the method according to the first aspect.

Figure 3:
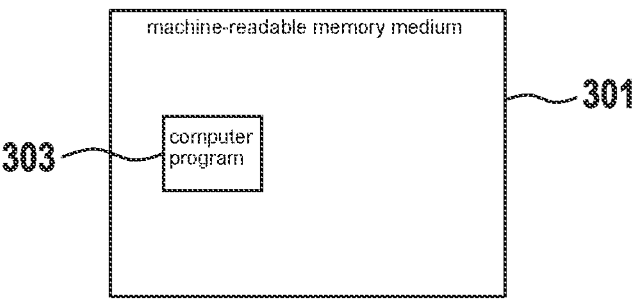
FIG. 3 shows a machine-readable memory medium, according to an example embodiment of the present invention.

FIG. 3 shows a machine-readable memory medium 301 on which a computer program 303 is stored. The computer program 303 includes commands which, when the computer program 303 is executed by an event chain according to the second aspect, prompt the event chain to carry out a method according to the first aspect.

Figure 4:
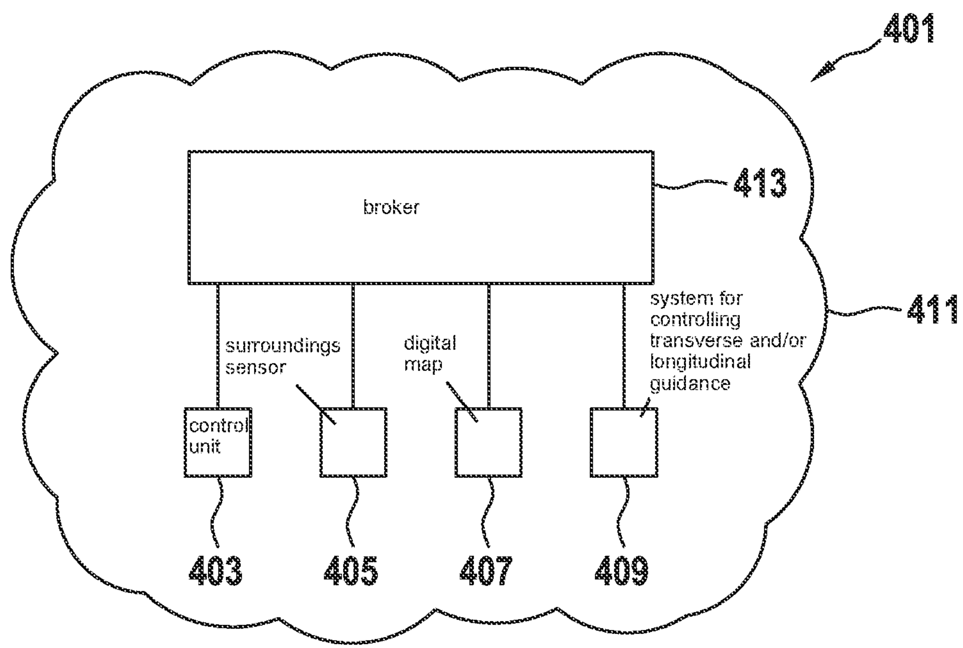
FIG. 4 shows a second event chain for an at least semi-automated driving function of a motor vehicle, according to an example embodiment of the present invention.

FIG. 4 shows a second event chain 401 for an at least semi-automated driving function of a motor vehicle.

Second event chain 401 includes multiple components: a control unit 403 of the motor vehicle, a surroundings sensor 405 of the motor vehicle, a digital map 407 of the motor vehicle, and a system 409 for controlling a transverse guidance and/or longitudinal guidance of the motor vehicle.

System 409 includes, for example, a steering system of the motor vehicle and/or a drive system of the motor vehicle or a braking system of the motor vehicle.

Components 403, 405, 407, 409 are communication users of a publish-subscriber network 411. Surroundings sensor 405 detects surroundings of the motor vehicle and publishes a message including surroundings data, which represent the detected surroundings.

Digital map 407 also publishes a message that includes at least one section of the digital map in which the motor vehicle is located.

The two messages of digital map 407 and of surroundings sensor 405 are sent to control unit 403. For this purpose, publish-subscriber network 411 includes a broker 413, which forwards the published messages to control unit 403.

Control unit 403 ascertains a control command for controlling a transverse guidance and/or longitudinal guidance of the motor vehicle based on the surroundings data and based on the section of the digital map 407 and publishes this ascertained control command as a message. Broker 413 receives this message including the control command and forwards it to system 409 for controlling the transverse guidance and/or longitudinal guidance of the motor vehicle. Based on the control command, system 409 controls the transverse guidance and/or longitudinal guidance of the motor vehicle.

In general, sensors and the digital map are, for example, publishers. Actuators are, for example, subscribers, but also, for example, publishers, for example, for pieces of feedback information from, for example, a wheel rotation speed sensor and/or an inertial sensor and/or a steering sensor.

What is claimed is:

1. A method for communicating between multiple components of an event chain for an at least semi-automated driving function of a motor vehicle, each of the multiple components being a communication participant of a publish-subscriber network, the method comprising the following steps:

publishing a first message using a first component of the multiple components;

sending the first message to a second component of the multiple components; and receiving the first message using the second component, wherein at least one of the multiple components includes a digital map and a processor, wherein the processer publishes a message to the publish-subscriber network that includes at least one section of the digital map in which the motor vehicle is located, wherein the processor of the second component is configured to ascertain a control command for controlling both a transverse guidance and a longitudinal guidance of the motor vehicle based on (i) surroundings data received from a first component configured as a surroundings sensor, and (ii) data representing the at least one section of the digital map in which the motor vehicle is located, wherein the surroundings data and the digital map data are received via the publish-subscriber network, and wherein the control command is ascertained in accordance with a time cycle of the publish-subscriber network.

2. The method as recited in claim 1, wherein the first message is published on a particular topic, the first message being sent to the second component as a function of whether the second component has subscribed to the particular topic.

3. The method as recited in claim 1, wherein the first message is sent to the second component as a function of whether an attribute and/or a content of the first message corresponds to a limitation defined using the second component.

4. The method as recited in claim 1, wherein the second component publishes a second message based on the first message, which is sent to a third component of the multiple components.

5. The method as recited in claim 1, wherein the multiple components are each an element selected from the following group of components: (i) surroundings sensor, (ii) actuator sensor of the motor vehicle, (iii) inertial sensor of the motor vehicle, (iv) wheel rotation speed sensor of the motor vehicle, (v) steering sensor of the motor vehicle, (vi) main control unit of the motor vehicle, (vii) actuator control unit of the motor vehicle, (viii) digital map, (ix) system for controlling a transverse guidance and/or longitudinal guidance of the motor vehicle including a steering system of the motor vehicle and/or a drive system of the motor vehicle and/or a braking system of the motor vehicle.

6. The method as recited in claim 4, wherein the first component is a surroundings sensor which detects surroundings of the motor vehicle, the first message includes surroundings data, which represent the detected surroundings, the second component is a control unit of the motor vehicle, the third component is a system for controlling a transverse guidance and/or longitudinal guidance of the motor vehicle, the control unit ascertaining a control command for controlling a transverse guidance and/or longitudinal guidance of the motor vehicle based on the surroundings data, the second message including the control command, the system for controlling a transverse guidance and/or longitudinal guidance of the motor vehicle controlling the transverse guidance and/or longitudinal guidance of the motor vehicle based on the control command.

7. The method as recited in claim 1, wherein the second component communicates in which time cycle the second component expects a message from the first component, the first message being sent to the second component based on the time cycle.

8. The method as recited in claim 7, wherein the publish-subscriber network includes a broker to which the first message is sent, the broker sending the first message to the second component.

9. The method as recited in claim 8, wherein the second component communicates the time cycle to the broker, the broker prompting the first component to send the first message to the broker based on the time cycle.

10. An event chain for an at least semi-automated driving function of a motor vehicle, the event chain comprising:

multiple components, which are communication participants of a publish-subscriber network;

wherein the event chain is configured for communicating between multiple components of an event chain for an at least semi-automated driving function of a motor vehicle, each of the multiple components being a communication participant of a publish-subscriber network, the event chain configured to:

publish a first message using a first component of the multiple components;

send the first message to a second component of the multiple components; and receive the first message using the second component, wherein at least one of the multiple components includes a digital map and a processor, wherein the processer publishes a message to the publish-subscriber network that includes at least one section of the digital map in which the motor vehicle is located, wherein the processor of the second component is configured to ascertain a control command for controlling a transverse guidance and/or longitudinal guidance of the motor vehicle based on surroundings data and based on the at least one section of the digital map in which the motor vehicle is located, wherein the surroundings data and the digital map data are received via the publish-subscriber network, and wherein the control command is ascertained in accordance with a time cycle of the publish-subscriber network.

11. A non-transitory machine-readable memory medium on which is stored a computer program for communicating between multiple components of an event chain for an at least semi-automated driving function of a motor vehicle, each of the multiple components being a communication participant of a publish-subscriber network, the computer program, when executed by an event chain, causing the event chain to perform the following steps:

publishing a first message using a first component of the multiple components;

sending the first message to a second component of the multiple components; and receiving the first message using the second component, wherein at least one of the multiple components includes a digital map and a processor, wherein the processer publishes a message to the publish-subscriber network that includes at least one section of the digital map in which the motor vehicle is located, wherein the processor of the second component is configured to ascertain a control command for controlling both a transverse guidance and a longitudinal guidance of the motor vehicle based on (i) surroundings data received from a first component configured as a surroundings sensor, and (ii) data representing the at least one section of the digital map in which the motor vehicle is located, wherein the surroundings data and the digital map data are received via the publish-subscriber network, and wherein the control command is ascertained in accordance with a time cycle of the publish-subscriber network.

* * * * *